(12) United States Patent
Liou

(10) Patent No.: US 8,250,388 B2
(45) Date of Patent: Aug. 21, 2012

(54) POWER SUPPLY CIRCUIT FOR CPU

(75) Inventor: Chih-Ta Liou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 228 days.

(21) Appl. No.: 12/771,093

(22) Filed: Apr. 30, 2010

(65) Prior Publication Data

US 2011/0241737 A1    Oct. 6, 2011

(30) Foreign Application Priority Data

Mar. 30, 2010  (CN) .......................... 2010 1 0135300

(51) Int. Cl.
*G06F 1/26* (2006.01)

(52) U.S. Cl. ........................ 713/300; 323/282; 363/21.1

(58) Field of Classification Search .................. 323/282; 363/21.1; 713/300

See application file for complete search history.

(56) References Cited

U.S. PATENT DOCUMENTS

| 7,202,643 B2* | 4/2007 | Miftakhutdinov | 323/224 |
| 7,265,601 B2* | 9/2007 | Ahmad | 327/403 |
| 2010/0277151 A1* | 11/2010 | Tsai et al. | 323/283 |

* cited by examiner

*Primary Examiner* — Albert Wang
(74) *Attorney, Agent, or Firm* — Altis Law Group, Inc.

(57) ABSTRACT

A power supply circuit is configured for supplying power to a central processing unit (CPU). The power supply circuit includes a pulse-width modulation (PWM) controller, a driving integrated circuit (IC), a first transistor, a second transistor, and a voltage regulator. The PWM controller is capable of outputting a PWM signal to regulate a voltage supplied to the CPU. The driving IC is connected to the PWM controller and capable of outputting a first driving signal and a second driving signal according to the PWM signal. The first transistor is connected to the driving IC and controlled by the first driving signal. The second transistor is connected to the driving IC and controlled by the second driving signal. The voltage regulator is capable of regulating a voltage of a power source to an optimized voltage and supplies the driving IC with the optimized voltage.

15 Claims, 3 Drawing Sheets

POWER SUPPLY CIRCUIT FOR CPU

BACKGROUND

1. Technical Field

The present disclosure relates to a power supply circuit for supplying power to a central processing unit (CPU).

2. Description of Related Art

Referring to FIG. 3, a typical power supply circuit for supplying power to a CPU includes a pulse-width modulation (PWM) controller and a driving integrated circuit (IC). The driving IC is connected to a pair of MOSFETS. The PWM controller outputs a PWM signal to the driving IC. The driving IC outputs signals to switch on/off the MOSFETS according to a sequence determined by the PWM controller, thereby regulating a voltage output to the CPU. The driving IC may be an ADP3120A chip which has a Vcc power pin. The ADP3120A chip can work with a voltage in a range of 4.15V-13.2V. Preferably, the ADP3120A chip should work at an optimized voltage (e.g., 10V). If the ADP3120A chip is supplied with the optimized voltage, a conversion efficiency of the ADP3120A chip is optimized, which reduces power consumption in the power supply circuit. However, the driving IC of the typical power supply circuit is supplied with a 12V voltage rather than the optimized voltage. A conversion efficiency of the driving IC is not optimized, and waste energy.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
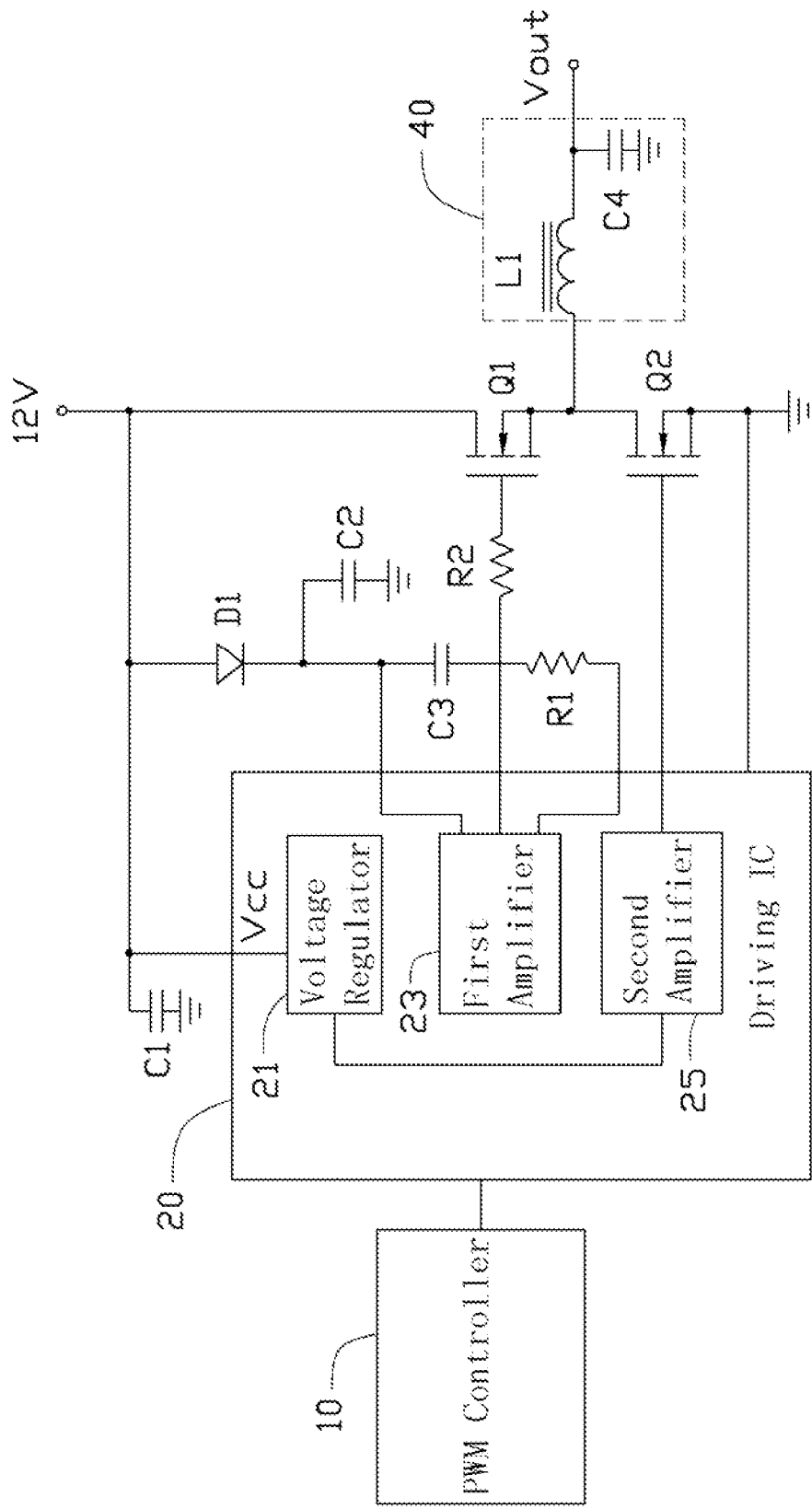
FIG. 1 illustrates a power supply circuit for supplying power to a CPU according to an embodiment of the present disclosure.

Referring to FIG. 1, an embodiment of a power supply circuit is configured for supplying power to a CPU on a motherboard. The power supply circuit includes a PWM controller 10, a driving IC 20, a first transistor Q1, and a second transistor Q2. The first and second transistors Q1, Q2 are N-channel enhancement MOSFETS. Two driving signal output terminals of the driving IC 20 are respectively connected to the first transistor Q1 and the second transistor Q2. The PWM controller 10 outputs a PWM signal to the driving IC 20. The driving IC 20 outputs signals to switch on/off the first and second transistors Q1, Q2 according to a sequence determined by the PWM signals for controlling a voltage output to the CPU.

The driving IC 20 includes a voltage regulator 21, a first operational amplifier 23, and a second operational amplifier 25. An input terminal of the voltage regulator 21 is connected to a Vcc power pin of the driving IC 20. An output terminal of the voltage regulator 21 is connected to the second operational amplifier 25. In one embodiment shown in FIG. 2, the voltage regulator 21 is integrated in the driving IC 20. The Vcc power pin of the driving IC 20 is supplied with a 12V power source provided by the motherboard. A first capacitor C1 is connected to the 12V power source for smoothing a power signal input to the driving IC 20. An upper terminal of the first operational amplifier 23 is connected the 12V power source via a diode D1. A second capacitor C2 is connected to a cathode of the diode D1. A third capacitor C3 and a resistor R1 is connected in series between the upper terminal and a lower terminal of the first operational amplifier 23. A mid-terminal (driving signal output terminal) of the first operational amplifier 23 is connected to a base of the first transistor Q1 via a resistor R2. An input terminal of the second operational amplifier 25 is connected to the voltage regulator 21, and an output terminal (driving signal output terminal) of the second operational amplifier 23 is connected to a base of the second transistor Q2. A drain of the first transistor Q1 is supplied with the 12V power source, and a source of the first transistor Q1 is connected to a charge storage circuit 40. A drain of the second transistor Q2 is connected to the charge storage circuit 40, and a source of the second transistor Q2 is connected to ground. The charge storage circuit 40 includes an inductor L1 and a fourth capacitor C4 for smoothing an output voltage (Vout) to the CPU.

During the power supply circuit supplying power to the CPU, the PWM controller 10 outputs a PWM signal with a predetermined duty cycle to the driving IC 20. The first operational amplifier 23 of the driving IC 20 outputs a first driving signal to the first transistor Q1, and the second operational amplifier 25 of the driving IC 20 outputs a second driving signal to the second transistor Q2. When the PWM signal is at high level, the first driving signal is at high level to switch on the first transistor Q1, and the 12V power source charges the first inductor L1 and the fourth capacitor C4. When the PWM signal is at low level, the second driving signal is at high level to switch on the second transistor Q2 and the inductor L1, and the fourth capacitor C4 is discharged to the CPU. Since the transistors Q1, Q2 are switched on/off rapidly and the inductor L1 and the fourth capacitor C4 have the ability to smooth the voltage output (Vout) to the CPU, the power supply circuit can supply the CPU with an appropriate well conditioned working voltage (e.g., 1.3V).

Figure 2:
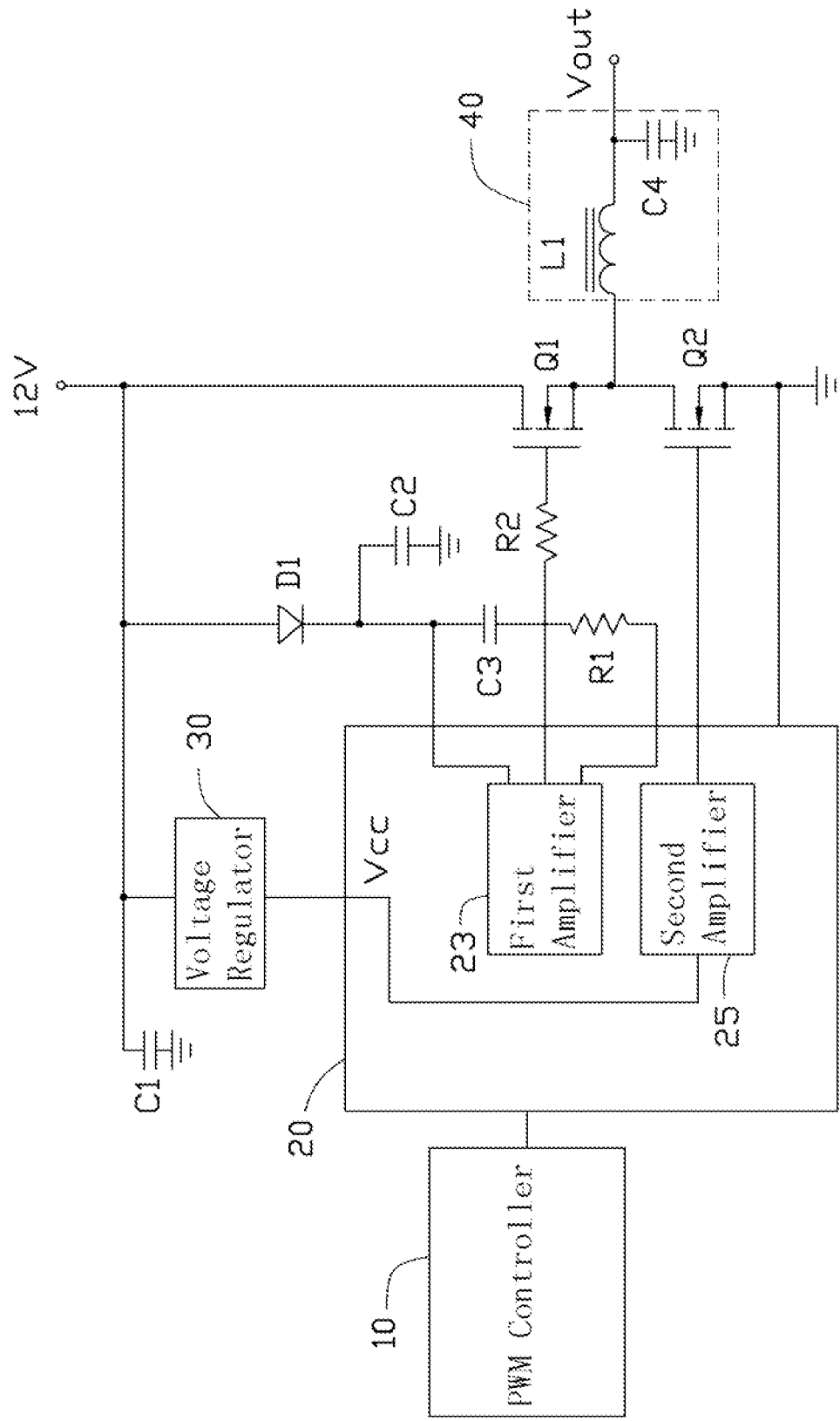
FIG. 2 illustrates a power supply circuit for supplying power to a CPU according to a second embodiment of the present disclosure.
Figure 3:
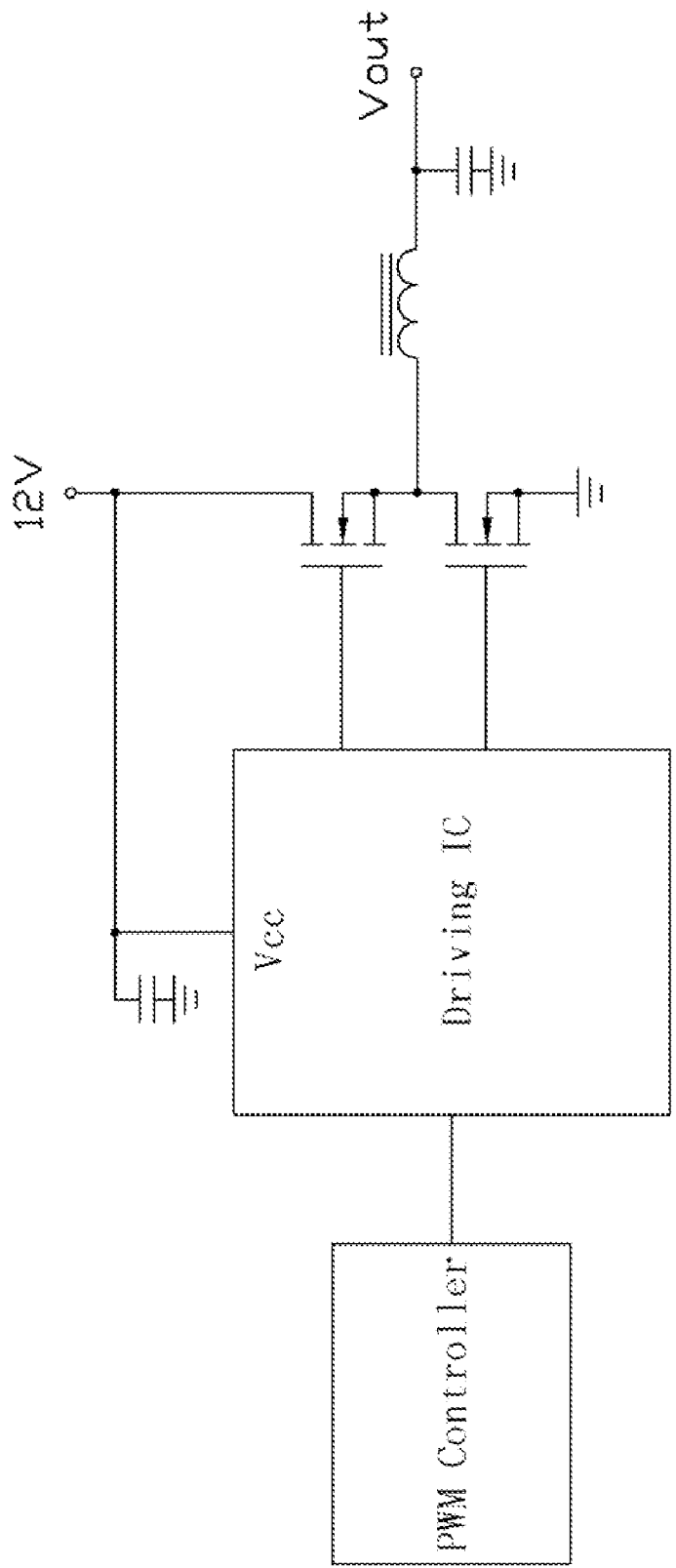
FIG. 3 illustrates a typical power supply circuit for supplying power to a CPU according to the prior art.

Referring to FIG. 2, a second embodiment of the power supply circuit utilizes a voltage regulator 30 to regulate a voltage supplied to the driving IC 20. An input terminal of the voltage regulator 30 is connected to the 12V power source and an output terminal of the voltage regulator 30 is connected to the Vcc power pin of the driving IC 20.

In the embodiments described above, the voltage regulators 21 or 30 regulate the 12V power source to an optimized voltage and supplies the driving IC 20 with the optimized voltage, and the driving IC 20 can work efficiently and use less power.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A power supply circuit for supplying power to a Central Processing Unit (CPU), the power supply circuit comprising:
a Pulse-Width Modulation (PWM) controller capable of outputting a PWM signal;

a driving Integrated Circuit (IC) connected to the PWM controller and capable of outputting a first driving signal and a second driving signal according to the PWM signal;

a first transistor connected to the driving IC and controlled by the first driving signal;

a second transistor connected to the driving IC and controlled by the second driving signal;

a voltage regulator, connected to the driving IC, capable of regulating a voltage of a power source to an optimized voltage, and supplying the driving IC with the optimized voltage;

wherein the driving IC comprises a first operational amplifier and a second operational amplifier; the first operational amplifier has a first driving signal output terminal configured to output the first driving signal to the first transistor, an upper terminal, and a lower terminal; a first capacitor and a resistor is connected in series between the upper terminal and the lower terminal; the second operational amplifier has a second driving signal output terminal configured to output the second driving signal to the second transistor; and the second operational amplifier is connected to an output terminal of the voltage regulator to receive the optimized voltage; and the upper terminal of the first operational amplifier is connected to the power source via a diode, an anode of the diode is connected to the power source, and a cathode of the diode is connected to the upper terminal of the first operational amplifier.

2. The power supply circuit of claim 1, wherein the voltage regulator is connected between the power source and a power pin of the driving IC.

3. The power supply circuit of claim 1, wherein the voltage regulator is integrated in the driving IC and connected to a power pin of the driving IC.

4. The power supply circuit of claim 1, wherein each of the first and second transistors is an N-channel enhancement MOSFET.

5. The power supply circuit of claim 4, wherein a first base of the first transistor is connected to the first driving signal output terminal, a first drain of the first transistor is supplied with the power source, a first source of the first transistor is connected to a second drain of the second transistor, a second base of the second transistor is connected to the second driving signal output terminal, and a second source of the second transistor is connected to ground.

6. The power supply circuit of claim 5, further comprising a charge storage circuit connected to the first transistor's source, wherein the charge storage circuit comprises an inductor and a capacitor, a first terminal of the inductor is connected to the first transistor's source, a second terminal of the inductor is configured to output the optimized voltage, and the capacitor is connected to the second terminal of the inductor.

7. The power supply circuit of claim 1, wherein the cathode of the diode is connected to ground via a second capacitor.

8. A power supply circuit for supplying power to a Central Processing Unit (CPU), the power supply circuit comprising:

a Pulse-Width Modulation (PWM) controller capable of outputting a PWM signal;

a driving Integrated Circuit (IC), connected to the PWM controller, comprising a first operational amplifier and a second operational amplifier; the first operational amplifier having a first driving signal output terminal, an upper terminal, and a lower terminal; a first capacitor and a resistor connected in series between the upper terminal and the lower terminal; the second operational amplifier having a second driving signal output terminal;

a first transistor connected to the first driving signal output terminal;

a second transistor connected to the second driving signal output terminal;

a charge storage circuit connected to a power source via the first transistor;

a voltage regulator capable of regulating a voltage of the power source to an optimized voltage and supplying the driving IC with the optimized voltage;

wherein the driving IC is capable of switching on or off the first transistor and the second transistor according to a sequence determined by the PWM signal, and the charge storage circuit is capable of supplying power to the CPU; and the upper terminal of the first operational amplifier is connected to the power source via a diode, an anode of the diode is connected to the power source, and a cathode of the diode is connected to the upper terminal of the first operational amplifier.

9. The power supply circuit of claim 8, wherein the voltage regulator is connected between the power source and a power pin of the driving IC.

10. The power supply circuit of claim 8, wherein the voltage regulator is integrated in the driving IC and connected to a power pin of the driving IC.

11. The power supply circuit of claim 8, wherein the second operational amplifier is connected to an output terminal of the voltage regulator.

12. The power supply circuit of claim 11, wherein each of the first and second transistors is an N-channel enhancement MOSFET.

13. The power supply circuit of claim 12, wherein a first base of the first transistor is connected to the first driving signal output terminal, a first drain of the first transistor is supplied with the power source, a first source of the first transistor is connected to a second drain of the second transistor, a second base of the second transistor is connected to the second driving signal output terminal, and a second source of the second transistor is connected to ground.

14. The power supply circuit of claim 13, wherein the charge storage circuit comprises an inductor and a capacitor, and a first terminal of the inductor is connected to the first transistor's source, a second terminal of the inductor is configured to output the optimized voltage, and the capacitor is connected to the second terminal of the inductor.

15. The power supply circuit of claim 8, wherein the cathode of the diode is connected to ground via a second capacitor.

* * * * *